United States Patent [19]

Hirano et al.

[11] Patent Number: 4,688,036

[45] Date of Patent: Aug. 18, 1987

[54] KEYLESS ENTRY SYSTEM FOR AUTOMOTIVE VEHICLE WITH POWER CONSUMPTION SAVING FEATURE

[75] Inventors: Motoki Hirano, Yokohama; Mikio Takeuchi; Kinichiro Nakano, both of Zama, all of Japan

[73] Assignee: Nissan Motor Company, Limited, Yokohama, Japan

[21] Appl. No.: 675,649

[22] Filed: Nov. 28, 1984

[30] Foreign Application Priority Data

Nov. 29, 1983 [JP] Japan ............................... 58-224958

[51] Int. Cl.[4] ........................ G08C 19/00; G06F 7/04; B62D 45/00; B60R 25/04

[52] U.S. Cl. .......................... 340/825.69; 340/825.31; 340/825.54; 307/10 AT; 70/257

[58] Field of Search .................. 340/825.3, 542, 52 D, 340/825.32, 825.69, 572, 825.54, 825.76, 528, 63, 64, 65, 56, 825.31; 70/252, 256, 257; 180/287; 307/10 AT, 10 R, 10 BP

[56] References Cited

U.S. PATENT DOCUMENTS

| | | | |
|---|---|---|---|
| 3,196,440 | 7/1965 | Weinstein | 340/825.72 |
| 3,891,980 | 6/1975 | Lewis et al. | 340/825.31 |
| 4,137,985 | 2/1979 | Winchell | 340/63 |
| 4,205,325 | 5/1980 | Haygood et al. | 340/825.32 |
| 4,249,161 | 2/1981 | Mohnhaupt | 340/52 D |
| 4,473,825 | 9/1984 | Walton | 340/825.54 |
| 4,477,806 | 10/1984 | Mochida et al. | 340/825.32 |
| 4,509,093 | 4/1985 | Stellberger | 340/825.31 |
| 4,638,292 | 1/1987 | Mochida et al. . | |

FOREIGN PATENT DOCUMENTS 0073068 3/1983 European Pat. Off. .

*Primary Examiner*—Ulysses Weldo
*Assistant Examiner*—Ralph Smith
*Attorney, Agent, or Firm*—Schwartz, Jeffery, Schwaab, Mack, Blumenthal & Evans

[57] ABSTRACT

A keyless entry system for an automotive vehicle allows operation of a vehicle device or devices without the need for an ignition key or other mechanical keys. A user can simply depress a single push-button or operate another suitable type of switch to activate the system and operate the desired vehicle device to the desired position. The system generally comprises a pocket-portable radio signal transmitter and a controller mounted on the vehicle and associated with the vehicle device. The transmitter has a small, long-life battery and the controller receives electric power from the vehicle battery. Power conservation for both the transmitter and the controller is achieved by activating them for limited periods in response to operation of the manual switch.

31 Claims, 11 Drawing Figures

KEYLESS ENTRY SYSTEM FOR AUTOMOTIVE VEHICLE WITH POWER CONSUMPTION SAVING FEATURE

BACKGROUND OF THE INVENTION

The present invention relates generally to an automotive keyless entry system which allows a user of a vehicle to lock/unlock a vehicle door or doors or to operate vehicle devices without an ignition key, other mechanical key or a relatively complicated, memorized code. More specifically, the invention relates to an energy-conservation feature in an automotive keyless entry system.

Conventionally, automotive door locks, trunk lid locks, glove box lid locks, steering lock devices and so forth have been operated by means of ignition or other mechanical keys. Recently, so-called "Keyless Entry Systems", which do not require keys to operate door locks, trunk locks, vehicle window regulators and so forth, have been developed. In such keyless entry systems, a keyboard is provided on the external surface of the vehicle body to allow entry of a preset code authorizing access to one of more desired vehicle devices. The designated vehicle devices are electrically operated when the entered code matches a preset code.

U.S. Pat. No. 4,205,325, to Haygood et al, discloses a keyless entry system for an automotive vehicle permitting a plurality of operations to be achieved from outside of the vehicle by one who is knowledgeable of preset digital codes. Functions such as unlocking the vehicle doors, opening the trunk lid, opening windows, operating the sun-roof or programming the system with a user-preferred digital access code can all be performed by proper sequential operation of a digital keyboard mounted on the outside of the vehicle.

This and other conventional keyless entry systems require the user to accurately input the preset code through the keyboard. Although such keyless entry systems have been well developed and considered useful for eliminating the need for mechanical keys, a serious problem may occur when the user of the vehicle forgets the preset code. If the user is outside of the vehicle and the vehicle door lock device is holding the door locked, the user cannot unlock the door lock until he remembers the preset code.

It would be convenient to operate the vehicle door locks other vehicle devices without using the mechanical keys and/or the preset codes, by one-touch operation on a keyboard. This can be done by somehow identifying users authorized to operate the door locks and other vehicle devices. After such identification, further keyboard operations would be required only in order to identify the vehicle devices to be operated. Identification may be achieved by way of signals at specific frequencies or encoded with specific digital information. However, in such cases, the detector must always remain on so as to be ready to respond to identification of the user, which needlessly drains power from the vehicle battery.

SUMMARY OF THE INVENTION

Therefore, the principle object of the present invention is to provide a novel keyless entry system which requires neither mechanical key operations nor entry of preset codes, each of which may be a combination of several code elements.

Another and more specific object of the present invention is to provide a keyless entry system for an automotive vehicle, which conserves electric power.

A further object of the present invention is to provide a keyless entry system which permits independent operation of various vehicle devices such as door locks, trunk lid locks, steering lock devices, etc.

In order to accomplish the aforementioned another object and advantages, an automotive keyless entry system, in accordance with the present invention, comprises a portable code signal transmitter which may of approximately the shape and size of a bank or credit card small enough to carry in a pocket, and a controller mounted on a vehicle. The transmitter produces a radio signal indicative of a unique code. The controller checks the unique code indicated by the radio signal from the transmitter against a preset code. When the unique code matches the preset code of the controller, the controller actuates vehicle devices, each of which incorporates an electric actuator operable by means of an electrical control signal produced by the controller.

The controller is associated with a manually operable switch to initiate operation of the keyless entry system. This, in turn, means that the keyless entry system, according to the invention, remains inoperative until the manual switch is operated. This satisfactorily conserves electric power.

In another preferred procedure, the keyless entry system set forth above includes a plurality of manual switches, each corresponding to one of the vehicle devices controlled.

The manual switches are mounted near the corresponding vehicle device in the preferred structure. Alternatively, the switches may all be mounted together at some convenient point on the outer surface of the vehicle body, such as on an outside door escutcheon.

BRIEF DESCRIPTION OF THE DRAWINGS

The present invention will be understood more fully from the detailed description of the invention given herebelow and from the accompanying drawings of the preferred embodiments of the invention, which, however, should not be taken to limit the invention to the specific embodiment or embodiments but are for explanation and understanding only.

In the drawings.

DESCRIPTION OF THE PREFERRED EMBODIMENT

Figure 1:
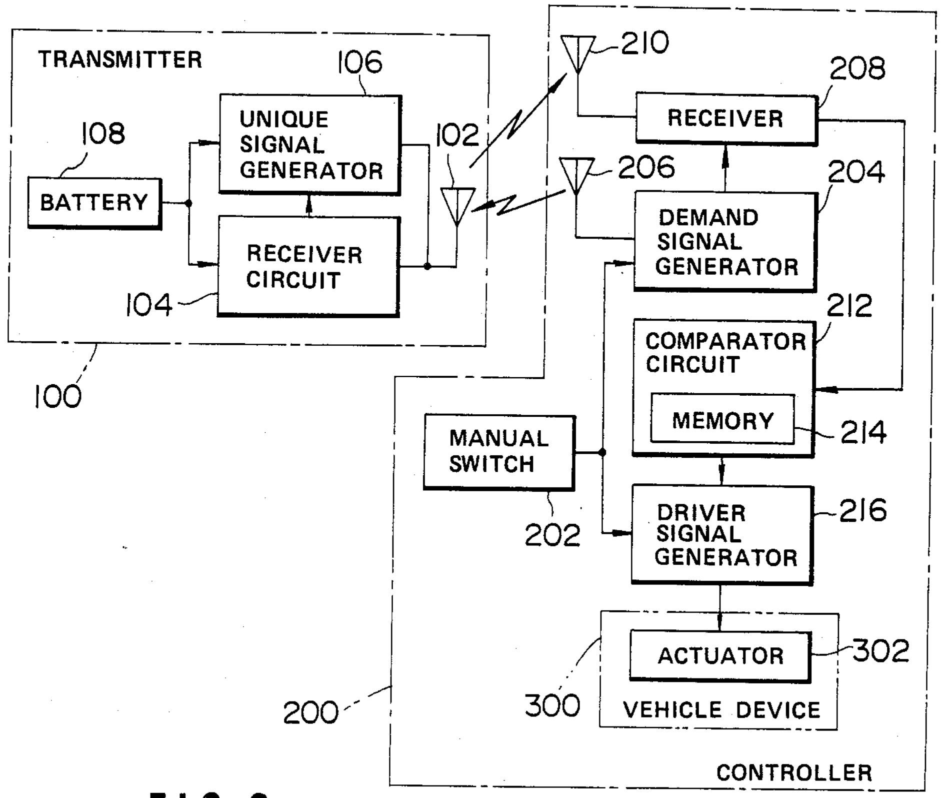
FIG. 1 is a block diagram of the general structure of a keyless entry system in accordance with the present invention.

FIG. 1 shows the general structure of a keyless entry system comprising a transmitter 100 and a controller 200. The transmitter 100 is small enough to carry in a clothing pocket and may specifically be comparable to a bank card or a credit card in size and shape. On the other hand, the controller 200 is mounted at a suitable point in the vehicle body and connected to actuate one or more vehicle devices 300, such as door locks, a trunk lid lock, a glove box lid lock, a steering wheel lock, and/or an ignition switch. The controller is also connected to one or more manual switches 202, each of which can be manually operated from outside of the vehicle to activate the transmitter and the controller and then to operate any of the given vehicle devices.

The fundamental purpose of the keyless entry system is that the manual switch 202 can be operated to operate the corresponding vehicle devices 300. The controller 200 is responsive to operation of the manual switch 202 to produce a radio signal with a specific frequency, which will be referred to hereafter as "demand signal". A demand signal generator 204 in the controller produces the demand signal in response to depression of the manual switch 202. The demand signal is transmitted by a transmitter antenna 206. The transmitter antenna 206 may be mounted on the external surface of the vehicle body near the vehicle device 300 to be operated. For example, if the vehicle device 300 to be operated were the left-front door lock, the transmitter antenna 206 might then be mounted on the window pane of the left-front door or on a mirror mounted on the left-front door. In practice, the transmitter antenna 206 will be a loop-antenna printed on the chosen area of the vehicle.

The transmitter 100 also has a transmitter/receiver antenna 102 which may be a loop-antenna printed on the outer surface of a transmitter casing. The antenna 102 is connected to a receiver circuit 104 of the transmitter 100 to receive the demand signal from the controller. The receiver circuit 104 is, in turn, connected to a unique signal generator 106 which generates a radio signal indicative of a unique combination of several digits in binary code. The radio signal produced by the unique signal generator 106 will be referred to hereafter as "unique code signal". The code indicated by the unique code signal is unique for each transmitter and serves to identify the transmitter 100. The unique code signal of the unique signal generator 106 is transmitted by the antenna 102.

A receiver 208 with a receiver antenna 210 is provided in the controller to receive the unique code signal from the transmitter 100. The receiver antenna 210 is also mounted on the external surface of the vehicle body near the transmitter antenna 206. The receiver 208 is connected to the demand signal generator 204 and responsive to the demand signal to be activated for a predetermined period of time. In other words, the receiver 208 is active for the predetermined period of time after the demand signal is transmitted. Signals received within the predetermined period of time are converted into binary code signals indicative of any and all digits encoded in the signal as they would be in the transmitter 100. The receiver 208 sends the converted binary code signal to a comparator circuit 212. The comparator circuit 212 includes a memory 214 storing a present code which matches the unique code of a transmitter 100. The comparator circuit 212 compares the binary-coded digits from the receiver 208 with the preset code and produces a trigger signal when the codes match. A driver signal generator 216 is responsive to the trigger signal produced by the comparator circuit 212 to produce a driver signal for an actuator 302 in the vehicle device.

In cases where the keyless entry system is adapted to operate more than one vehicle device, the driver signal generator 216 is also connected to the manual switches 202 so as to be able to operate the corresponding vehicle devices. The driver signal generator 216 recognizes which of the manual switches 202 is operated and sends a driver signal to the actuator of the corresponding vehicle device.

In the aforementioned arrangement, the transmitter 100 uses a small, long-life battery 108 as a power source. In practice, a mercury battery or its equivalent could be used in the transmitter. On the other hand, the controller 200 uses a vehicle battery 218 as a power source. The aforementioned keyless entry system according to the present invention achieves conservation of battery power by being operative only when the manual switch is operated. It would be convenient to provide a weak battery alarm in the system. A suitable weak battery-alarm feature for a keyless entry system has been disclosed in the co-pending U.S. patent application Ser. No. 657,783 filed on Sept. 18, 1984, commonly assigned to the assignee of the present invention. The disclosure of this co-pending U.S. patent application is herein incorporated by reference for the sake of disclosure.

Figure 2:
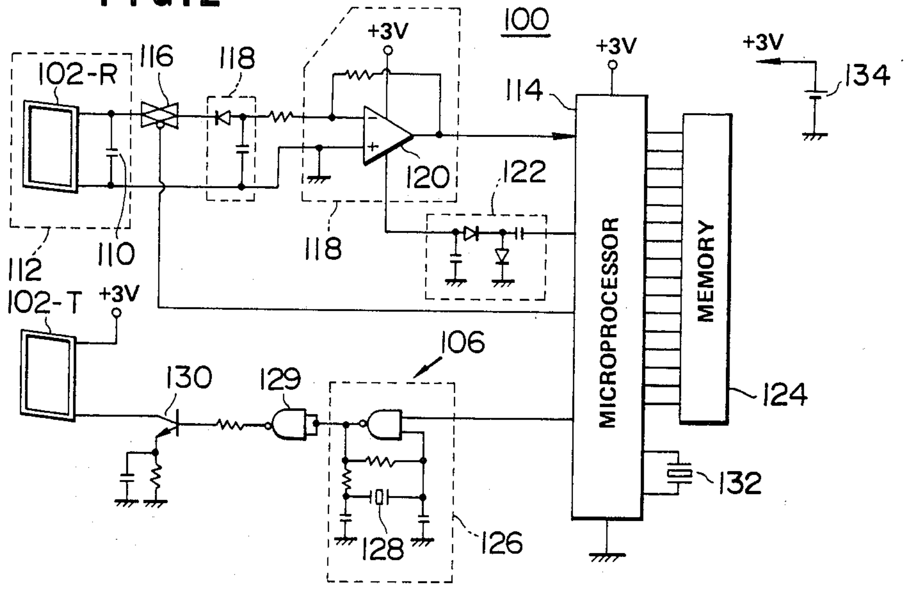
FIG. 2 is a circuit diagram of a portable transmitter in the first embodiment of a keyless entry system in accordance with the present invention.
Figure 3:
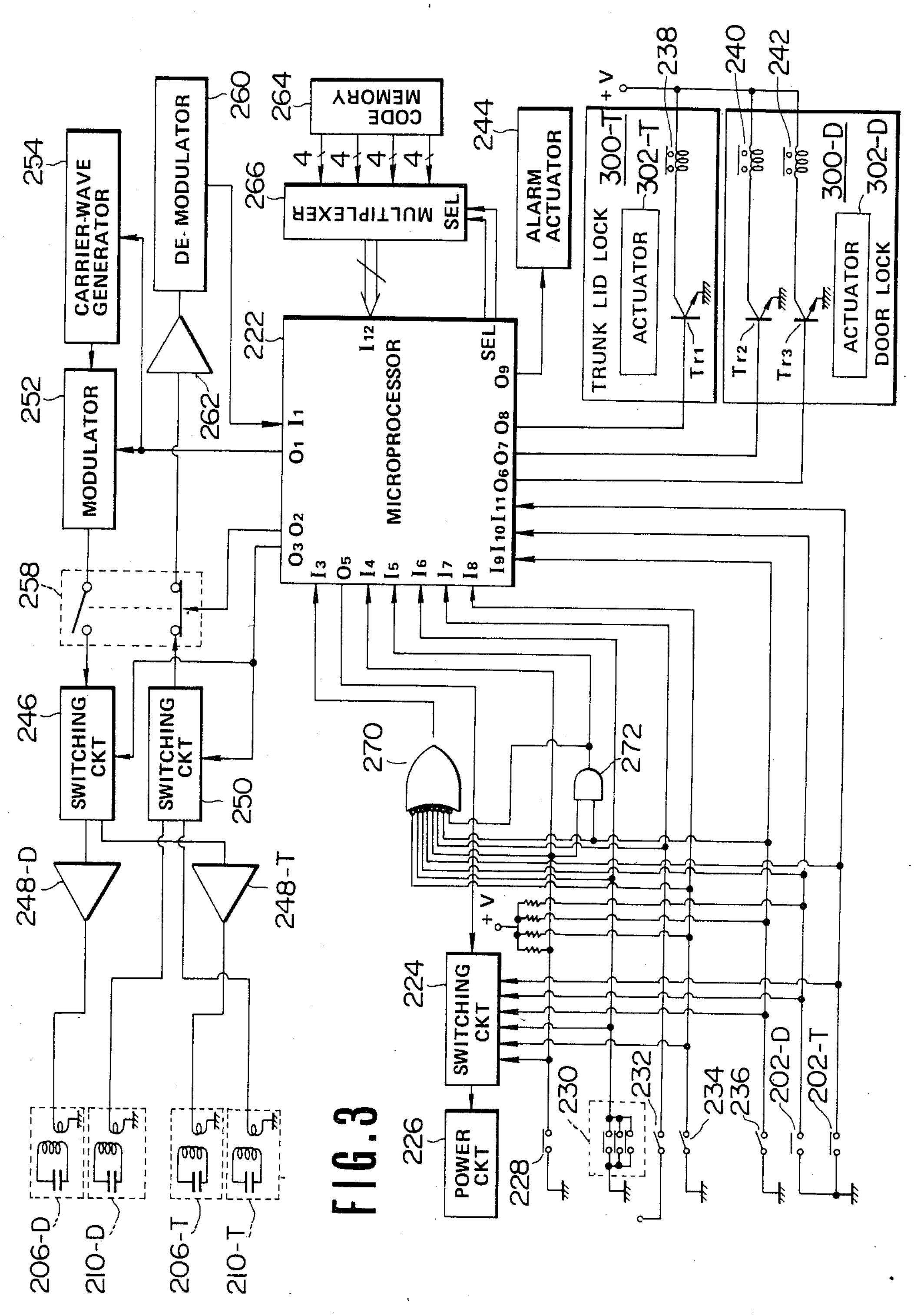
FIG. 3 is a circuit diagram of a vehicle-mounted controller in the first embodiment of a keyless entry system of the present invention, which controller is co-operative with the transmitter of FIG. 2.

Referring now to FIGS. 2 to 6, in which the first embodiment of the keyless entry system is illustrated in more detail, the transmitter circuit is illustrated in FIG. 2 and the controller circuit is illustrated in FIG. 3.

As shown in FIG. 2, as in the controller 200, the transmitter 100 is provided with a pair of loop antennas 102-R and 102-T which are printed on the outer surface of the transmitter casing (not shown). The antenna 102-R is connected to the receiver circuit 104 and serves as a receiver antenna. On the other hand, the antenna 102-T is connected to the unique signal generator 106 and serves as a transmitter antenna. A capacitor 110 is connected in parallel with the receiver antenna 102-R to form a passive antenna circuit 112. The antenna circuit 112 captures by electromagnetic induction the demand signal from the controller 200 produced in response to depression of one of the manual switches 202.

The antenna circuit 112 is connected to a microprocessor 114 via an analog switch 116, a detector circuit 118 and an amplifier 120. A negative power supply circuit 122 is inserted between an output terminal of the microprocessor 114 and the amplifier 120 to invert a 0 or +3 V binary pulse output from the microprocessor into a 0 to −3 V input to the amplifier. This negative power is supplied to the amplifier to adjust the bias point of the amplifier to 0 V.

The microprocessor 114 is connected to a memory 124 storing the preset unique code. In practice, the memory stores four predetermined, four-bit, BCD digits. The memory 124 can be a ROM pre-masked with the preset code. However, in order to minimize the cost, it would be advantageous to use a circuit in the form of a printed circuit board including elements corresponding to each bit. When the circuit element is connected, it is indicative of "1" and when the circuit element is cut or disconnected, it is indicative of "0". By this arrangement, the preset code may be input simply to the microprocessor 114.

The microprocessor 114 is adapted to be triggered by the demand signal from the controller 200, i.e., input to the microprocessor 114 through the antenna 102-R, the analog switch 116, the detector circuit 118 and the amplifier 120 serves as the trigger signal for the microprocessor. In response to the trigger signal, the microprocessor 114 reads the preset unique code from the memory 124 and sends a serial pulse-form unique code signal indicative of the unique code to a modulator 126. The modulator 126 includes a crystal oscillator 128 for generating a carrier wave for the unique code signal. In the modulator 126, the unique code signal and the carrier wave are modulated into a radio signal in which the unique code signal rides on the carrier wave. The modulated radio signal is output through a buffer 129, a high-frequency transistor 130 and a transmitter antenna 102-T.

Another crystal oscillator 132 is connected to the microprocessor 114. The oscillator 132 may serve as a clock generator for feeding a clock signal to the microprocessor.

In the above arrangement of the transmitter, electric power is supplied to each component by a small, long-life-type lithium cell 134 such as are used in an electronic watch. The microcomputer to be used for the transmitter 100 is of the low-voltage CMOS type. The analog switch 118 and the amplifier 120 IC units are also chosen to be of the power-saving type. As a result, stand-by operation requires only about 4 to 5 mA. This means that the transmitter 100 can be used for about one year before replacing the lithium battery.

Figure 4:
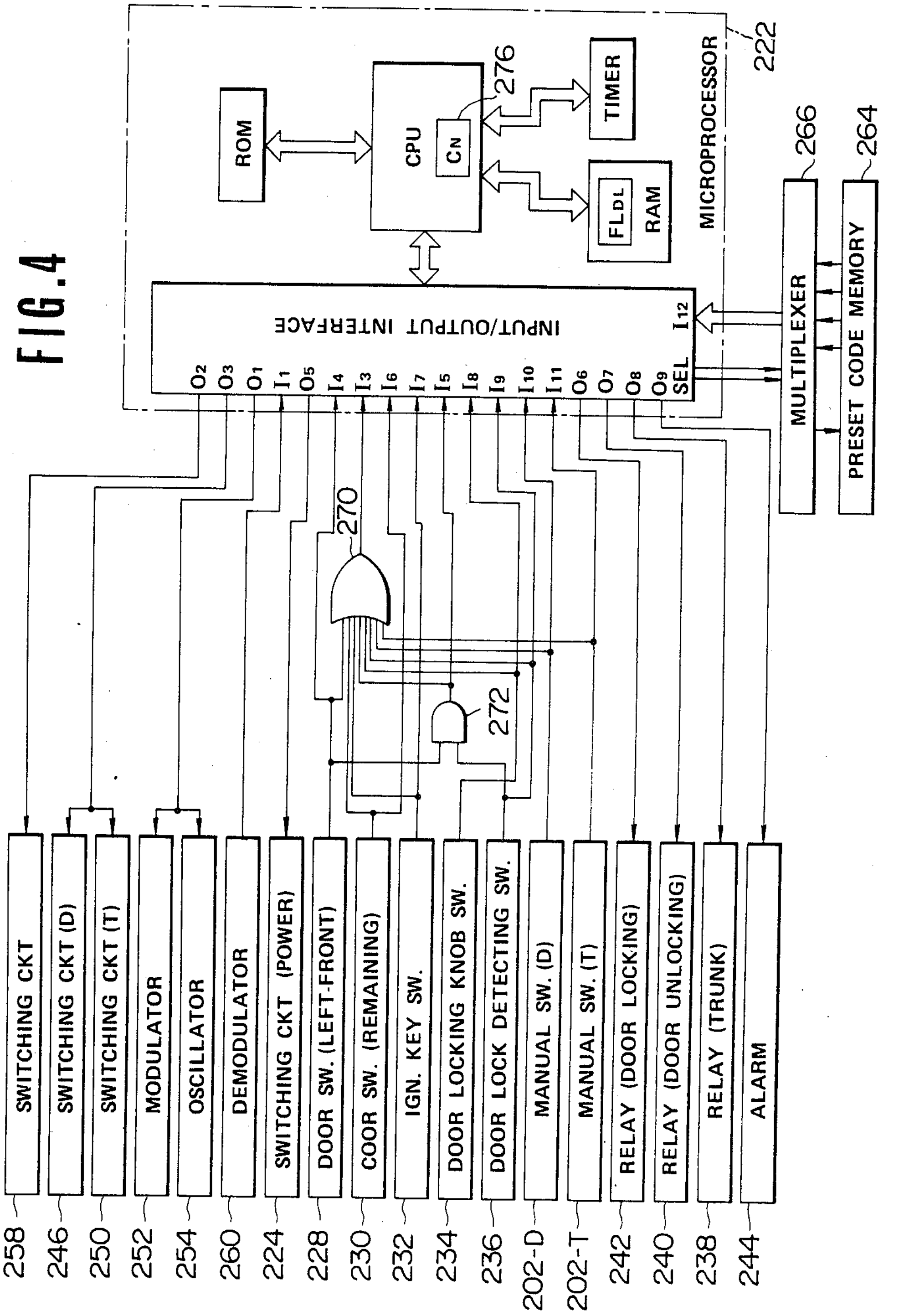
FIG. 4 is a block diagram of microprocessor and its connection to the remainder of the controller of FIG. 2.

As shown in FIGS. 3 and 4, the controller 200 comprises a microprocessor 222 including an input/output interface, CPU, ROM, RAM, timer and so forth. The microprocessor 222 is connected to manual switches 202-D and 202-T. In the shown embodiment, the keyless entry system is designed to operate a door lock 300-D and a trunk-lid lock 300-T. Accordingly, the manual switch 202-D is connected to operate the door lock 300-D and the manual switch 202-T is similarly operable when the trunk lid lock 300-T is to be operated. The manual switches 202-D and 202-T are connected to the input terminals $I_{10}$ and $I_{11}$ of the microprocessor 222. The manual switches 202-D and 202-T are also connected to a switching circuit 224 inserted between the output terminal $O_5$ of the microprocessor 222 and a power supply circuit 226.

The switching circuit 224 is also connected to a driver's door switch 228, passenger door switches 230, an ignition key switch 232, a door lock knob switch 234 and a door-lock-detecting switch 236. The driver's door switch 228 detects opening and closing of the left-front door adjacent the driver's seat and is closed while the left-front door is open. The passenger door switches 230, detects opening and closing of the right-front door and the rear doors. These switches 230 close when the corresponding door opens. The door switches are built and operated as conventionally utilized for door closure monitoring. Alternatively, it would be simpler to connect the switching circuit 224 to conventional door switches.

The ignition key switch 232 is installed within or near an ignition key cylinder and detects the presence of an ignition key in the key cylinder. The ignition key switch 232 is closed while the ignition key is within the key cylinder.

The door lock knob switch 234 is responsive to a manual door locking operation by which the door lock of the driver's door is manually operated in the door-locking direction. The door lock knob switch 234 closes when the door lock knob is operated manually to perform door locking. The door lock detecting switch 236 detects the locking state of the door lock; specifically the switch 236 is closed while any of the door locks are unlocked and is open when all of the door locks are in their locking positions.

The switching circuit 224 is responsive to closure of any one of the switches 202-D, 202-T, 228, 230, 232, 234 and 236 to trigger the power supply circuit 226 for a given period of time. The power supply circuit 226 is active for the given period of time to supply a vehicle battery power to the various components of the controller circuit. In addition, the switching circuit 224 is responsive to high-level output from the output terminal $O_5$ of the microprocessor 222 to be held active and thus sustain operation of the power supply circuit 226 as long as the high-level output continues. The switching circuit 224 deactivates the power supply circuit when the output level of the output terminal $O_5$ drops from high to low.

Output terminals $O_6$, $O_7$ and $O_9$ of the microprocessor 222 are respectively connected to actuator relays 238, 240 and 242 via switching transistors $Tr_1$ - $Tr_3$. The actuator relay 238 is associated with an actuator 302-T of the trunk lid lock 300-T. The actuator relays 240 and 242 are associated with an actuator 302-D of the door lock 300-D. In practice, the actuator 302-D comprises a reversible motor which actuates the door lock 300-D to its locked position when driven in one direction and to its unlocked position when driven in the other direction. Two relays 240 and 242 are adapted to reverse the polarity of power supply and thus switch the driving direction of the reversible motor. For instance, when the relay 240 is energized, the reversible motor 302-D is driven in the doorunlocking direction. On the other hand, when the relay 242 is energized, the reversible motor 302-D is driven in the door-locking direction. Therefore, the output level at the output terminal $O_7$ goes high when the door is to be unlocked and the output terminal $O_8$ goes high when the door is to be locked.

The microprocessor 222 is programmed to execute a theft-preventive operation in response to a specific condition. For example, if the the door switch is closed while the door lock detecting switch is open, a theft-preventive alarm signal is output via the output terminal $O_9$ which is connected to an alarm actuator 244. In practice, the alarm actuator 244 may be connected to a vehicular horn to activate the latter in response to the theft-preventive alarm signal. This theft-preventive operation in keyless entry systems has been disclosed in the European Patent First Publication 00 73 068, published on March 2, 1983. The disclosure of this European Patent First Publication is herein incorporated by reference for the sake of disclosure.

Figure 7:
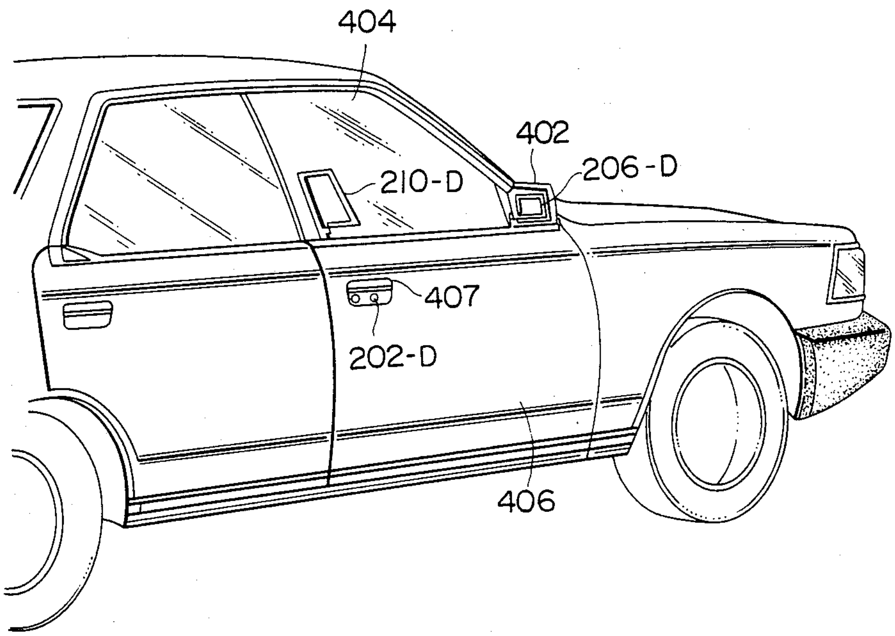
FIGS. 7 to 9 are illustrations of three possible arrangements of antennas in the first embodiment of keyless entry system.
Figure 8:
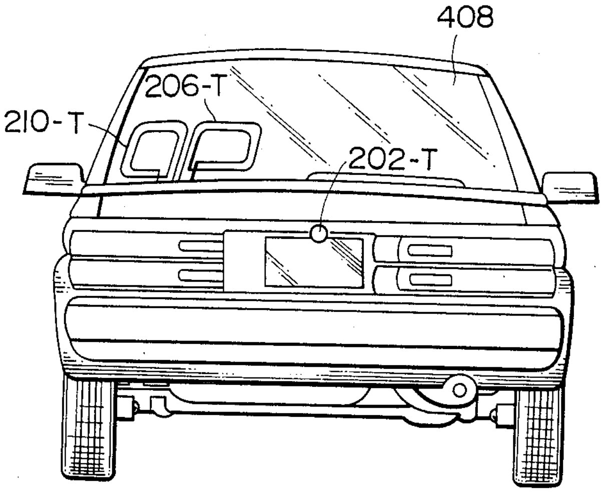

The antennas 206-D and 210-D in the shown embodiment are located near the door locks and the trunk lid locks. As an example, the antenna 206-D may be applied to or printed on the reflective surface of a door mirror 402, as shown in FIG. 7. The antenna 210-D may be applied to or printed on a window pane 404 of the vehicle side door 406. On the other hand, the antennas 206-T and 210-T are mounted near the trunk lid lock and may be applied to or printed on the rear windshield 408, as shown in FIG. 8.

Returning to FIG. 3, the antennas 206-D and 206-T are connected to a switching circuit 246 via amplifiers 248-D and 248-T. One of the antennas 206-D and 206-T is selectively activated to transmit the demand signal. For instance, when the manual switch 202-D is depressed to produce the demand signal, the antenna 206-D will become active to transmit the demand signal. On the other hand, when the manual switch 202-T is depressed, the antenna 206-T becomes active. The switching circuit 246 is connected to the output terminal $O_3$ to receive a switching signal from the microprocessor 222 which controls its switch position and thus which of the antennas 206-D and 206-T is connected to the output terminal $O_1$ of the microprocessor 222 via the modulator 252 and another switch 258. The modulator 252 is connected to a carrier-wave generator 254 comprising a crystal oscillator. The modulator 252 and the carrier-wave generator 254 are triggered by high-level output from the output terminal $O_1$ of the microprocessor to transmit the demand signal through the switching circuit 246 and the selected one of the amplifiers 248-D and 248-T and one of the corresponding antennas 206-D and 206-T.

Antennas 210-D and 210-T are connected to another switching circuit 250 which is, in turn, connected to a demodulator 260 via the switching circuit 258 and an amplifier 262. The demodulator 260 removes the carrier-wave component from the unique code-indicative radio signal from the transmitter 100. The demodulator 260 is connected to the input terminal $I_1$ to send the information demodulated from the unique code-indicative radio signal to the microprocessor 222. The microprocessor 222 is triggered by this input at the input terminal $I_1$ to read out a preset code from a preset code memory 264 via a multiplexer 266. The microprocessor 222 compares the unique code with the preset code read from the preset code memory. The microprocessor 222 outputs a drive signal through one of the output terminals $O_6$, $O_7$ and $O_8$ corresponding to the manual switch 202 depressed.

It would be convenient for the preset code memory 264 to be an external memory connectable to the terminal of the multiplexer 266. In this case, the preset code memory 264 could be stored with the corresponding transmitter 100 as a separate unit. The present code memory 264 and the transmitter 100 would be added to the vehicle upon sale so that the separate memory-and-transmitter unit would not be separated from the matching controller. In practice, the preset code memory is programmed by shorting some of a plurality of individual bit cells so as to have a binary output corresponding to the unique code.

The switching circuit 258 is connected to the output terminal $O_2$ of the microprocessor 222 through which a state change-over signal is output. the state change-over signal is indicative of whether the system is transmitting the demand signal or receiving the unique code-indicative radio signal from the transmitter 100. In practice, the microprocessor 222 keeps the switching circuit 250 in the transmitting state for a given period of time in response to depression of one of the manual switches. Thereafter, the microprocessor 222 then switches the switching circuit 250 to the receiving state. Similarly to the switching circuit 246, the switching circuit 250 is connected to the output terminal $O_3$ of the microprocessor 222 to activate one of the antennas 210-D and 210-T according to which manual switch was depressed.

As will be seen from FIG. 3, the door switches 228 and 230, the ignition key switch 232, the door lock knob switch 234 and the door lock detecting switch 236 are respectively connected to the microprocessor 222 through input terminals $I_4$, $I_6$, $I_7$, $I_8$ and $I_5$.

Depression of one of the manual switches 202-D or 202-T triggers the microprocessor 222 to execute the control program stored therein.

Figure 5:
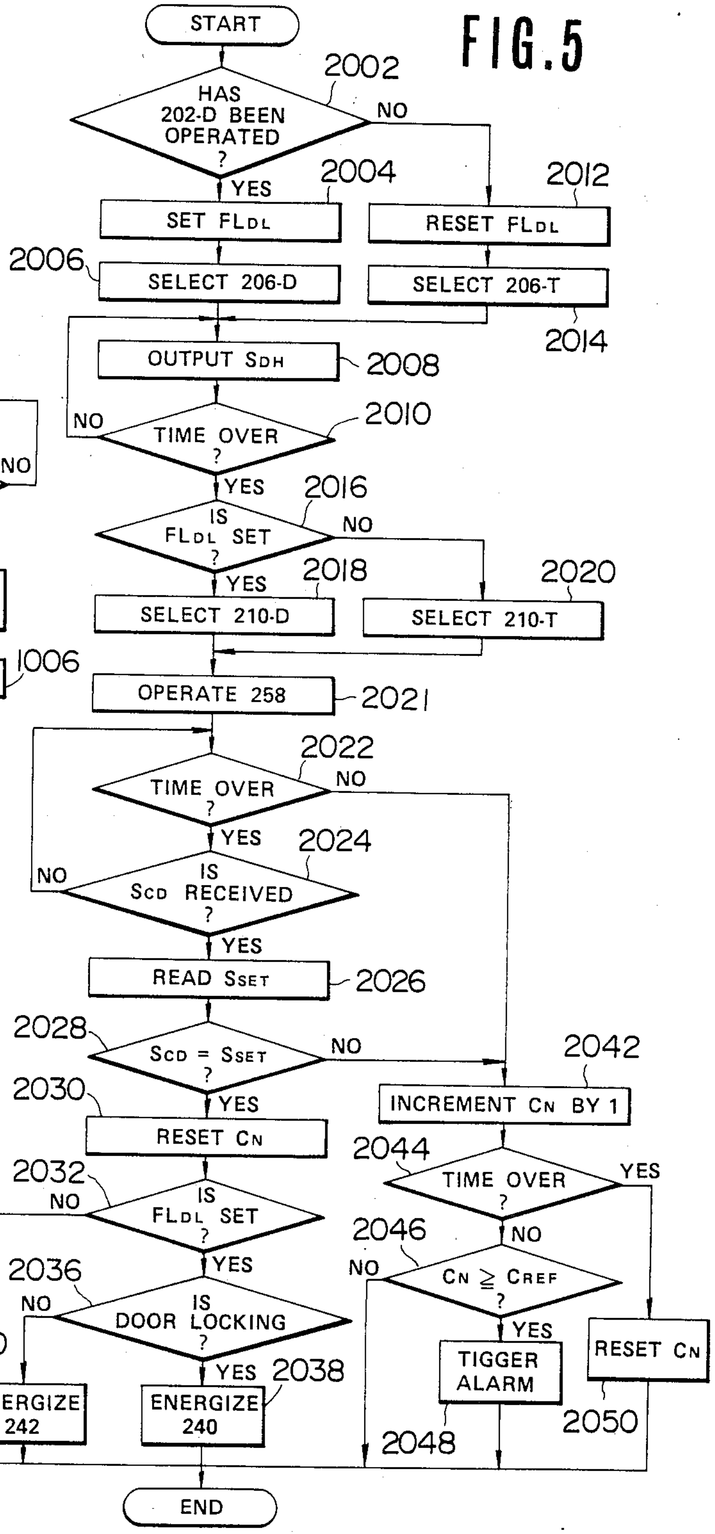

In practice, the microprocessor 222 starts to execute the control program of FIG. 5 when the input level at either the input terminal $I_{10}$ or the input terminal $I_{11}$ goes high in response to depression of either of the manual switches 202-D and 202-T. At the same time, in response to depression of one of the manual switches 202-D and 202-T, the output of the OR gate 270 which is also connected for input from the driver's door switch 228, the door lock knob switch 234, goes high, if it is not already high. The OR-gate 270 is, in turn, connected for output to the input terminal $I_3$. In response to a high-level output from the OR gate 270, the output level at the output terminal $O_5$ goes high which activates the switching circuit 224 to supply power to the entire controller system 200.

It should be appreciated that the output of the OR gate 270 will also go high whenever both the driver's door switch 228 and the door locking detecting switch 236 are open, which causes the output of an AND gate 272 to go high. The output terminal of AND gate 272 is connected to one of the input terminals of the OR gate 270.

Figure 6:
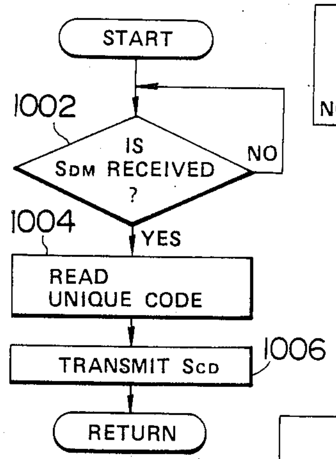
FIGS. 5 and 6 are flowchart of programs to be executed by the controller of FIG. 3.

FIGS. 5 and 6 illustrate the operation of the transmitter 100 and the controller 200 in the form of flowcharts of programs executed by the microprocessors thereof. Since the transmitter 100 and the controller 200 must co-operate, their operation will be described separately in terms of the sequence of steps actually executed after depression or operation of one of the manual switches.

During execution of the control program of FIG. 5, first, the input levels at the input terminals $I_{10}$ and $I_{11}$ are checked at a block 2002. This block 2002 in fact determines which of the manual switches 202-D or 202-T was depressed. When a low-level input is detected at the input terminal $I_{10}$ is detected i.e. when the manual switch 202-D is closed, and than a door lock actuation flag $FL_{DL}$ is set in a flag register 274 in RAM, at a block 2004. Thereafter, the transmitter antenna 206-D is selected for operation at a block 2006.

In practice, when the transmitter antenna 206-D is selected, the output level at the output terminal $O_3$ of the input/output interface of the microprocessor 222 is held LOW to actuate the switching circuit 246 to its normal position and so connect the antenna 206-D to the switching circuit 250. The output terminal $O_2$ connected to the switching circuit 250 also outputs a low-level signal to actuate the switching circuit 258 to its normal position. In the normal position, the switching circuit 250 connects the modulator 252 to the switching circuit 246.

On the other hand, if the manual switch 202-T, rather than 202-D, is depressed, the door lock actuation flag $FL_{DL}$ is reset at a block 2012. Then the antenna 206-T is selected at a block 2014. When the antenna 206-T is selected, the output level at the output terminal $O_3$ turns HIGH to shift the switching circuit 246 to the position at which the antenna 206-T is connected to the modulator 252 through the switching circuit 250. In this case as well, a low-level output from output terminal $O_2$ connects switch 246 while disconnecting switch 250. After block 2006 or 2014, the output level at the output terminal $O_1$ goes high to trigger the modulator 252 and the carrier-wave generator 254 to generate the demand signal $S_{DM}$, as represented by the block 2008. At the same time, a timer 276 incorporated in the microprocessor 222 is activated to measure elapsed time of transmission of the demand signal $S_{DM}$. Elapsed time is checked at a block 2010 and if the elapsed period of time is less than a predetermined period of time, the process returns to the block 2008 to continue transmission of the demand signal until the predetermined period of time expires. In other words, the blocks 2008 and 2010 loop until the predetermined time expires.

Thereafter, the door actuation indicative flag $FL_{DL}$ is checked at a block 2016. If the door lock actuation indicative flag is set, the antenna 210-D is selected at a block 2018. Otherwise, the antenna 210-T is selected at a block 2020.

If the antenna 210-D is selected, the output level at the output terminal $O_3$ is held low to actuate the switching circuit 250 to its normal position in order to connect the antenna 210-D to the demodulator 260 via the switching circuit 258. On the other hand, if the antenna 210-T is selected at the block 2020, then the output level at the output terminal $O_3$ goes high to shift the switching circuit 250 so as to connect the antenna 210-T to the demodulator 260 via the switching circuit 258.

After the block 2018 or 2020, the output level at the output terminal $O_2$ goes high to actuate the switching circuit 258 to the position at which the switching circuit 250 is connected to the demodulator 260 at a block 2021. Therefore, the receiver antenna 210-D or 210-T corresponding to the selected manual switch 202-D or 202-T becomes active to receive the unique code-indicative radio signal from the transmitter 100. This condition continues until the unique code-indicative radio signal is received or another predetermined period of time expires. Elapsed time is checked at a block 2022, and until the second period of time expires, reception of the code signal $S_{CD}$ from the transmitter 100 is checked at a block 2024. If the code signal $S_{CD}$ has not yet been received, control returns to the block 2022 to check elapsed time again. The blocks 2022 and 2024 loop until the code signal is received or the second period expires. In practice, reception of the code signal $S_{CD}$ is checked by checking the input level at the input terminal $I_1$. Reception of the code signal $S_{CD}$ is recognized when the input level at the input terminal goes from low to high.

Upon reception of the code signal $S_{CD}$ at the block 2024, the preset code $S_{SET}$ is read out from the preset code memory 264 through the multiplexer 266, at a block 2026. After this, the unique code indicated in the code signal $S_{CD}$ is compared with the preset code $S_{SET}$ from the preset code memory 264 at a block 2028. If the codes match, a counter 276 (refer to FIG. 4) is reset at a block 2030.

The door actuation indicative flag $FL_{DL}$ is then checked again at a block 2032. If the flag $FL_{DL}$ is not set when checked at the block 2032, control passes to a block 2034 wherein a high-level signal is output via the output terminal $O_8$ to activate the transistor $T_{r1}$ and energize the relay 238. Energization of the relay 238 operates the trunk lid lock actuator 302-T which unlocks the trunk lid lock 300-T. Thereafter, the program ends.

On the other hand, if the flag $FL_{DL}$ is set when checked at the block 2032, then the door lock 300-D is checked at a block 2036 to see if it is locked. In practice, the state of the door lock can be determined by checking the input level at the input terminal $I_{11}$. If the door is locked when checked at the block 2036, then the output level at the output terminal $O_7$ goes from low to high at a block 2038 to render the transistor $T_{r2}$ conductive and thus energize the relay 240. The door lock actuator 302-D is thus operated to unlock the door. On the other hand, if the door is unlocked when checked at the block 2036, then the output level at the output terminal $O_6$ goes high to activate the transistor $T_{r3}$ and thus energize the relay 242, at a block 2040. As a result, the door lock actuator, i.e. the reversible motor 302-D, is driven so as to lock the door. After either block 2038 or 2040, the program ends.

Back at block 2022, if the predetermined period expires before reception of the unique code-indicative signal, or if the received code fails to match the preset code $S_{SET}$ at the block 2028, control passes to a block 2042 wherein the counter value $C_N$ of the counter 276 is incremented by 1. Thereafter, elapsed time is checked again with respect to a preset theft-prevention time threshold at a block 2044. Until the time threshold is reached at the block 2044, the counter value $C_N$ is incremented by 1 each time the reception period expires at the block 2022 or an incorrect code is detected at the block 2028. The counter value $C_N$ is compared to a reference value $C_{REF}$ at a block 2046. If the counter value $C_N$ becomes equal to or greater than the reference value, the output level at the output terminal $O_9$ goes high to trigger the alarm actuator 244 at a block 2048. In practice, the alarm actuator 244 is associated with a vehicular horn as set forth above to activate the latter in response to a high-level output at the output terminal $O_9$.

After the theft-prevention time threshold expires at the block 2044, the counter 276 is reset at a block 2050.

FIG. 6 shows the control program to be executed by the microprocessor 114 in the transmitter 100 intermittently or continuously. An initial block 1002 checks for reception of the demand signal $S_{DM}$. This step is repeated continuously until the demand signal $S_{DM}$ is detected whereupon the unique code present in the memory 124 is read out at a block 1004. A carrier wave is then modulated to generate the unique code-indicative signal $S_{CD}$ which is then transmitted to the controller at a block 1006. After transmission of the unique codeindicative signal $S_{CD}$, the program ends.

FIGS. 7 and 8 show one mounting arrangement of antennas 206-D, 206-T and 210-D and 210-T on the vehicle. As shown in FIG. 7, the transmitter antenna 206-D is mounted on the reflector surface of the door mirror 402 and the receiver antenna 210-D is mounted on door window pane 404. The antennas 206-D and 210-D are installed near the outside door handle 407 on which the door lock operating manual switch 202-D is mounted. Also, it should be noted that the antennas 206-D and 210-D are oriented essentially perpendicular to each other. Although the shown embodiment uses the antennas only for transmitting and receiving the radio signal, it would be possible to use both antennas for both transmitting and receiving the radio signal. In fact, since the keyless entry system in accordance with the present invention uses electromagnetic induction for transmitting data, the phase of the antenna of the controller relative to the phase of the antenna of the transmitter is very important. In this case, one of the two perpendicularlydisposed antennas is selectively used or both antenna signal levels are mixed by a phase converter. Such a dual-antenna system has been disclosed in the co-pending U.S. patent application Ser. No. 651,784, filed on Sept. 18, 1984 and titled "RADIO-WAVE TRANSMISSION SYSTEM OF KEYLESS ENTRY SYSTEM FOR AUTOMOTIVE VEHICLE DEVICES". The disclosure of the above-identified U.S. patent application is hereby incorporated by reference for the sake of disclosure.

FIG. 8 shows arrangement of the antennas 206-T and 210-T which are adapted to be used for operating the trunk lid lock. Both of antennas 206-T and 210-T are mounted on the rear windshield 408 and disposed near the trunk lid lock operating manual switch 202-T. Although the antennas 206-T and 210-T are shown mounted on the windshield 408, they can be mounted along the edge of rear windshield instead. This arrangement has been disclosed in the co-pending U.S. patent application Ser. No. 651,784, filed Sept. 18, 1984, titled "RADIO-WAVE TRANSMISSION SYSTEM OF KEYLESS ENTRY SYSTEM". Disclosure of the above-identified U.S. patent application is hereby incorporated by reference.

Figure 9:
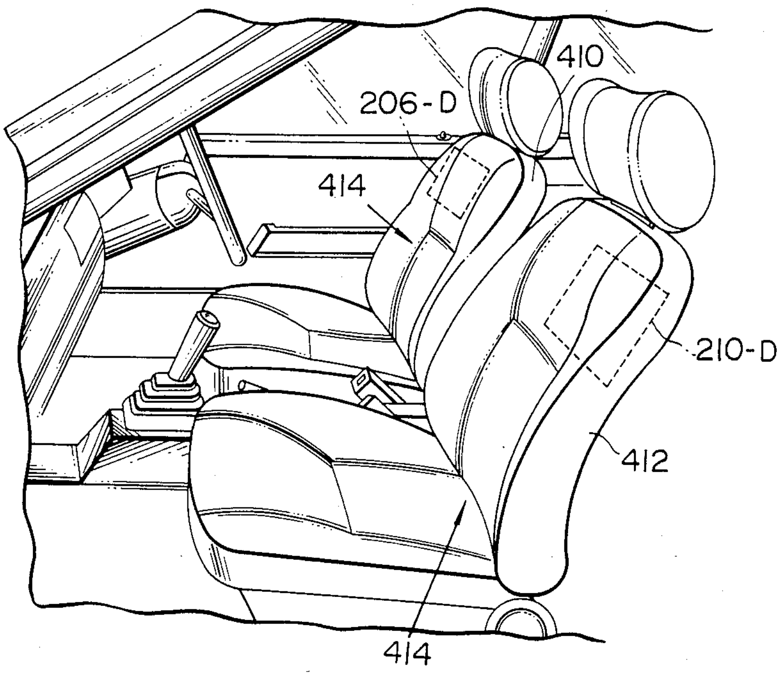

Alternatively, the transmitter antenna 206-D and the receiver antenna 210-D for operating the door lock can be mounted on the seat backs 410 and 412 of the front seats 414, as shown in FIG. 9.

Figure 10:
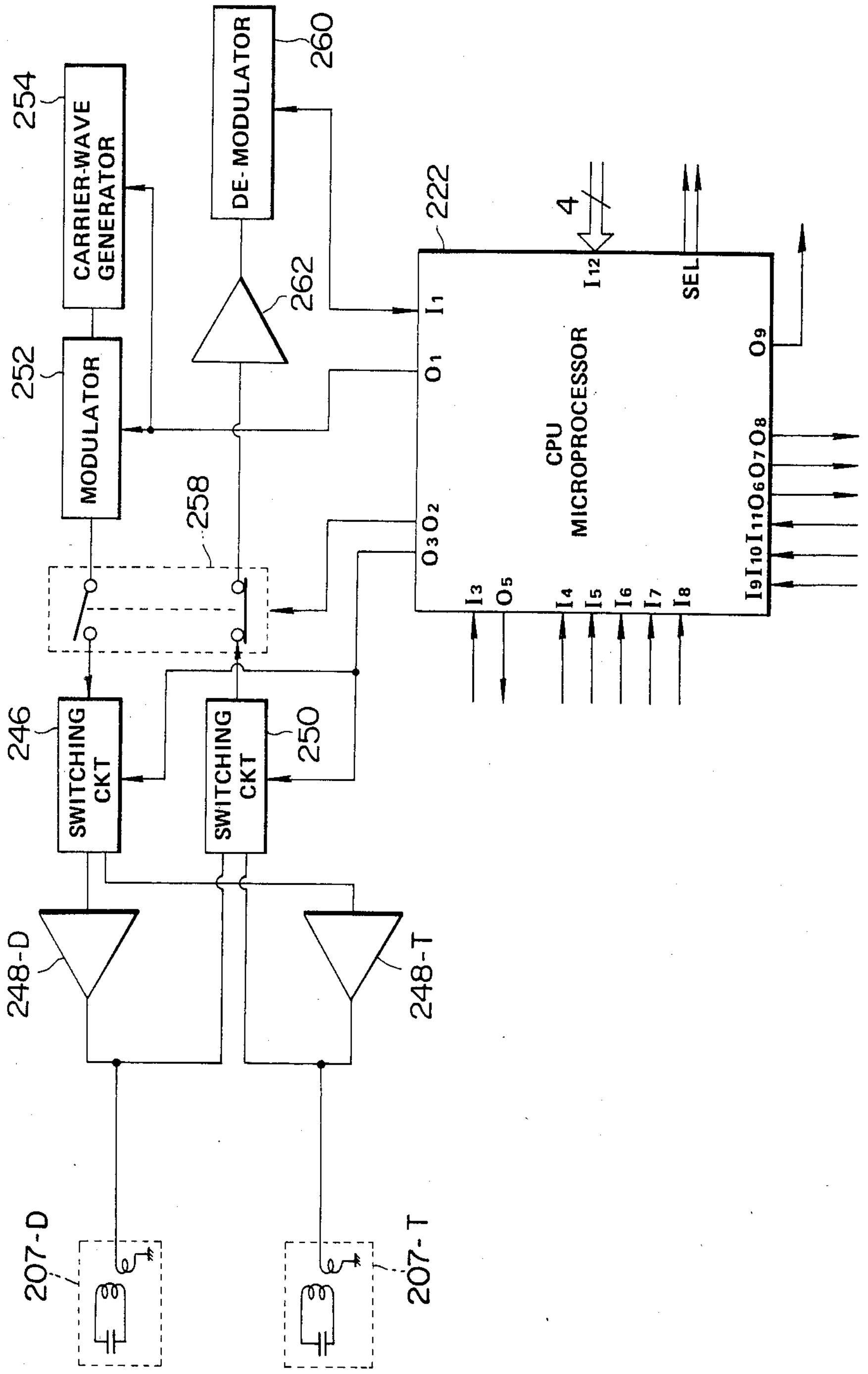
FIG. 10 is a block diagram of a controller of the second embodiment of the keyless entry system according to the present invention.

FIG. 10 shows a modification of the controller in the foregoing preferred embodiment of the invention. In this modification, transmitter/receiver antennas 207-D and 207-T are used for both transmitting and receiving radio signals. This can be achieved by connecting each of the antennas for input from switching circuit 246 via a corresponding amplifier 248-D or 248-T and for output to the switching circuit 250 directly. This arrangement would be less expensive than that of the foregoing preferred embodiment, resulting in a lower overall system cost.

As set forth above, in accordance with the present invention, since the electric power consumption in stand-by is very small in the transmitter, the service life of the battery in the transmitter can be satisfactorily prolonged. In addition, the power supply to the controller in the vehicle is carried out only after one of the manual switches is depressed. Almost no electric power will be consumed during stand-by.

Figure 11:
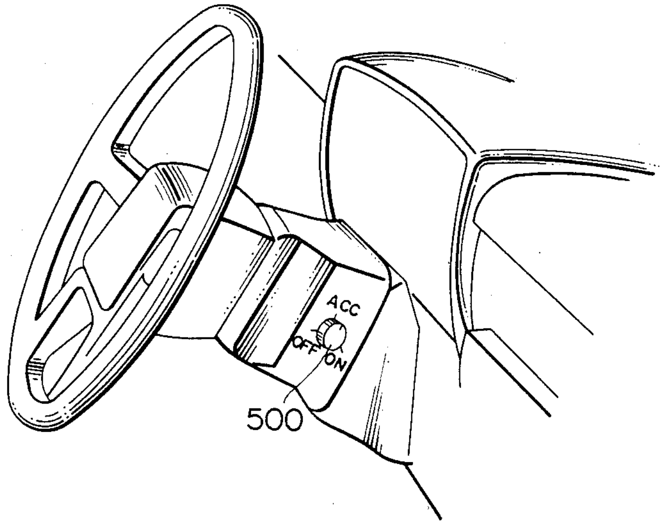
FIG. 11 is a perspective view of a modified vehicular starter switch arrangement associated with the keyless entry system according to the present invention.

FIG. 11 illustrates modified ignition switch distinguished from the conventional type employing an ignition key. In this modification, a rotary switch 500 operable to any of an OFF position, an ACC position in which power supply to the ignition system is blocked but power is supplied to electrical appliances in the vehicle, such as a radio, a clock, and the lighting system, an IG position in which power is supplied to both the ignition system and the electrical accessories, or a START position in which a starter motor is activated and power is supplied to the ignition system. A rotary-switch-type ignition switch for use with a keyless entry system of the type corresponding to that of the present invention has been disclosed in the co-pending U.S. patent application Ser. No. 651,782 filed Sept. 18, 1984. The contents of the above-identified co-pending U.S. patent application is hereby incorporated by reference for the sake of disclosure.

This rotary-switch-type ignition switch arrangement would be useful to allow keyless operation of ignition system. For instance, the rotary-switch-type ignition switch may be connected to the controller which controls the power supply to various systems associated with the various ignition switch positions. In this case, arrangement of the antennas on the seat backs of the front seat, as shown in FIG. 10, may be useful.

As set forth above, the keyless entry system is also applicable to operation of the ignition system. Furthermore, the ignition switch control by the controller may be used to lock and unlock a vehicular steering system. Additionally, the keyless entry system may be used to operate an automotive audio system, air conditioner, glove box lid lock and so forth. Therefore, the invention should not be considered to be limited to the specific applicable to door and trunk lid lock control, but can be applied to control of any desired vehicular equipment and/or devices.

What is claimed is:

1. A keyless entry system for an automotive vehicle device for actuating the vehicle device to a first active state and a second inactive state, comprising:

an electrical actuator connected to said vehicle device and responsive to a control signal for switching an operating state of said vehicle device between said first and second states;

a manual switch mounted on a vehicle body at a position near said vehicle device to be operated, said manual switch being normally open and being closed when it is manually operated;

a transmitter normally operating in a stand-by state in which it anticipates reception of a demand signal, said transmitter responding to said demand signal by outputting a radio signal indicative of a unique code which identifies said transmitter; and a controller mounted on the vehicle body and electrically connected to said actuator and said manual switch, incorporating a power supply system which includes said manual switch and is normally inactive so as not to supply electric power to said controller, said power supply system responding to actuation of said manual switch which connects said power supply system to said controller for supplying electric power. to said controller for a given period of time, said controller being responsive to the connection of said power supply for broadcasting said demand signal to said transmitter, for comparing said unique code upon reception from said transmitter to a preset code when said radio signal from said transmitter is received within said given period of time, and for producing said control signal if said unique code matches said preset code, wherein said power supply system is disconnected from said controller after said given period to deactivate said controller.

2. The keyless entry system as set forth in claim 1, wherein said controller broadcasts said demand signal for a predetermined period of time.

3. The keyless entry system as set forth in claim 2, wherein said controller operates in one of a first demand signal transmitting mode and a second unique code receiving mode, and said controller is switched from said first mode to said second mode after expiration of said predetermined period of time after the onset of power supply.

4. The keyless entry system as set forth in claim 3, wherein said transmitter is responsive to said demand signal to be active for another given period of time during which said unique code-indicative radio signal is continuously broadcast.

5. The keyless entry system as set forth in claim 4, wherein said controller is connected to a plurality of vehicle devices and further comprising a plurality of manual switches respectively corresponding to said vehicle devices, and a plurality of actuators connected to said vehicle devices for operating corresponding vehicle devices to one of first and second operating states, and wherein said controller includes means for detecting which of said manual switches has been operated, said controller sending a control signal to the one of said actuators corresponding to the manual switch operated.

6. The keyless entry system as set forth in claim 5, which further comprises a first antenna mounted on said transmitter and a plurality of second antennas mounted on a vehicle body and connected to said controller, and wherein data communication between said transmitter and said controller is performed by electromagnetic induction between said first antenna and the closest of said second antennas to said first antenna.

7. The keyless entry system as set forth in claim 6, wherein said manual switches are mounted on the outer surface of the vehicle body near the corresponding vehicle device so as to be operatable from outside of the vehicle and said second antennas are disposed near the corresponding manual switches.

8. The keyless entry system as set forth in claim 6, wherein one of said vehicle devices is door lock for locking and unlocking a vehicle door.

9. The keyless entry system as set forth in claim 8, wherein one of said actuators is associated with said door lock and comprises a reversible motor driveable in a first door-locking direction and a second door-unlocking direction.

10. The keyless entry system as set forth in claim 9, which further comprises a detector associated with said door lock to detect the status of said door lock and produce a detector signal indicative of the status of said door lock, and said controller is responsive to said detector signal to derive a control signal to drive said reversible motor in the direction of reversal of the position of the door lock between the door-locking position and the door-unlocking position.

11. The keyless entry system as set forth in claim 1, which further comprises a theft-preventive alarm system including a counter for counting the occurrences of operation of said manual switch and producing an alarm signal to activate an alarm device when the counter value reaches a predetermined value.

12. The keyless entry system as set forth in claim 11, wherein said counter is reset to clear its counter value whenever said unique code matches said preset code.

13. The keyless entry system as set forth in claim 12, wherein said counter is reset to clear its counter value if the time elapsed after the connection of said power supply reaches system a preset time.

14. The keyless entry system as set forth in claim 1, wherein said controller is connected to a plurality of vehicle devices and further comprising a plurality of manual switches respectively corresponding to said vehicle devices, and a plurality of actuators connected to said vehicle devices for operating corresponding vehicle devices to one of first and second operating states, and wherein said controller includes means for detecting which of said manual switches has been operated, said controller sending a control signal to the one of said actuators corresponding to the manual switch operated.

15. The keyless entry system as set forth in claim 14, which further comprises a first antenna mounted on said transmitter and a plurality of second antennas mounted on a vehicle body and connected to said controller, and wherein data communication between said transmitter and said controller is performed by electromagnetic induction among said antennas.

16. The keyless entry system as set forth in claim 15, wherein said manual switches are mounted on the outer surface of the vehicle body near the corresponding vehicle device so as to be operatable from outside of the vehicle and said second antennas are disposed near the corresponding manual switches.

17. The keyless entry system as set forth in claim 16, wherein one of said vehicle devices is a door lock for locking and unlocking a vehicle door.

18. The keyless entry system as set forth in claim 17, wherein one of said actuators is associated with said door lock and comprises a reversible motor driveable in a first door-locking direction and a second door-unlocking direction.

19. The keyless entry system as set forth in claim 18, which further comprises a detector associated with said door lock and connected to said controller to detect the status of said door lock and produce a detector signal indicative of the status of said door lock, and said controller is responsive to said detector signal to derive a control signal to drive said reversible motor in the direction of reversal of the position of the door lock between the door-locking position and the door-unlocking position.

20. A keyless entry system for automotive vehicle devices including a door lock allowing operation of said devices by authorized users of the vehicle without the need for a mechanical key, comprising:

a plurality of electrically operable actuators, each connected to one of said vehicle devices;

a plurality of manual switches, each of which is connected to one of said vehicle devices, and mounted on a vehicle body at a position nearby the corresponding one of said vehicle device to be operated, said manual switch being normally open and being closed when it is manually operated;

a transmitter small enough to fit in a clothing pocket and normally operating in a stand-by state in which it anticipates reception of a demand signal, said transmitter responding to said demand signal by broadcasting a radio signal indicative of a unique code which identifies said transmitter; and a controller mounted on the vehicle body and electrically connected to said actuator and said manual switch, incorporating a power supply system which includes said manual switch and is normally inactive so as not to supply electric power to said controller, which is responsive to operation of said manual switch and which connects said power supply system to said controller for supplying electric power to said controller for a given period of time, said controller being responsive to the connection of said power supply for broadcasting said demand signal to said transmitter, for identifying which vehicle device is to be operated in accordance with which manual switch has been operated, for receiving said unique code from said transmitter, for comparing said unique code with a preset code when said radio signal from said transmitter is received within said given period of time, for producing said control signal for said identified vehicle device and for sending said control signal to the corresponding one of said actuators when said unique code matches said preset code, wherein said power supply system is disconnected from said controller after said given period to deactivate said controller.

21. The keyless entry system as set forth in claim 20, wherein said transmitter includes a small, long-life battery which serves as a power source.

22. The keyless entry system as set forth in claim 21, wherein said small, long-life battery is a lithium battery.

23. The keyless entry system as set forth in claim 21, wherein said transmitter approximately matches a credit card in size and shape.

24. The keyless entry system as set forth in claim 23, wherein said controller broadcasts said demand signal for a predetermined period of time.

25. The keyless entry system as set forth in claim 24, wherein said controller operates in one of a first demand signal transmitting mode and a second unique code receiving mode, and said controller is switched from said first mode to said second mode after expiration of said predetermined period of time after the connection of said power supply system.

26. The keyless entry system as set forth in claim 25, wherein said transmitter is responsive to said demand signal to be active for another given period of time during which said unique code-indicative signal is continuously broadcast.

27. The keyless entry system as set forth in claim 26, which further comprises a theft-preventive alarm system including a counter for counting occurrences of operation of said manual switch, said alarm system producing an alarm signal which activates an alarm device when the counter value reaches a predetermined value.

28. The keyless entry system as set forth in claim 27, wherein said counter is reset whenever the input unique code matches said preset code.

29. The keyless entry system as set forth in claim 28, wherein said counter is reset when the elapsed time since the connection of said power supply system reaches a preset time.

30. A keyless entry system for an automotive vehicle device for actuating the vehicle device to a first active state and a second inactive state, comprising:

an electrical actuator connected to said vehicle device and responsive to a control signal for switching an operating state of said vehicle device between said first and second states;

a manual switch mounted on a vehicle body at a position near said vehicle device to be operated, said manual switch being normally open and being closed when it is manually operated;

a transmitter normally operating in a stand-by state in which it anticipates reception of a demand signal, said transmitter responding to said demand signal by outputting a radio signal indicative of a unique code which identifies said transmitter; and a controller mounted on the vehicle body and electrically connected to said actuator and said manual switch, incorporating a power supply system which includes said manual switch and is normally inactive so as not to supply electric power to said controller, said power supply system responding to actuation of said manual switch which connects said power supply system to said controller for supplying electric power to said controller, said controller being responsive to the connection of said power supply for broadcasting said demand signal to said transmitter for a first given period of time, said controller being held in a stand-by state for receiving said radio signal from said transmitter for a second given period of time subsequent to said first period of time, for comparing said unique code upon reception from said transmitter to a preset code when said radio signal from said transmitter is received within said second given period of time, and for producing said control signal if said unique code matches said preset code, wherein said power supply system is disconnected from said controller after said second given period to deactivate said controller.

31. A keyless entry system for automotive vehicle devices including a door lock allowing operation of said devices by authorized users of the vehicle without the need for a mechanical key, comprising:

a plurality of electrically operable actuators, each actuator connected to one of said vehicle devices;

a plurality of manual switches, each of which is connected to one of said vehicle devices, and mounted on a vehicle body at a position nearby the corresponding one of said vehicle devices to be operated, said manual switch being normally open and being closed when it is manually operated;

a transmitter small enough to fit in a clothing pocket and normally operating in a stand-by state in which it anticipates reception of a demand signal, said transmitter responding to said demand signal by broadcasting a radio signal indicative of a unique code which identifies said transmitter; and a controller mounted on the vehicle body and electrically connected to said actuator and said manual switch, incorporating a power supply system which includes said manual switch and is normally inactive so as not to supply electric power to said controller, which is responsive to operation of said manual switch which connects said power supply system to said controller for supplying electric power to said controller, said controller being responsive to the connection of said power supply for broadcasting said demand signal to said transmitter for a given first period of time, for identifying which vehicle device is to be operated in accordance with which manual switch has been operated, for receiving said unique code from said transmitter, for maintaining said stand-by state for reception of said unique code for a given second period of time, for comparing said received unit code with a preset code when said radio signal from said transmitter is received within said second given period of time, for producing said control signal for said identified vehicle device and for sending said control signal to the corresponding one of said actuators when said unique code matches said preset code, wherein said power supply system is disconnected from said controller after said second given period to deactivate said controller.

* * * * *